United States Patent [19]

Kido et al.

[11] Patent Number: 4,658,640
[45] Date of Patent: Apr. 21, 1987

[54] ACCELERATION DETECTING SYSTEMS FOR INTERNAL COMBUSTION ENGINES

[75] Inventors: Yoshinobu Kido, Higashihiroshima; Toshihiro Yamada, Hiroshima, both of Japan

[73] Assignee: Mazda Motor Corporation, Hiroshima, Japan

[21] Appl. No.: 824,762

[22] Filed: Jan. 31, 1986

[30] Foreign Application Priority Data

Feb. 3, 1985 [JP] Japan .................................. 60/19086

[51] Int. Cl.$^4$ .......................................... G01M 15/00
[52] U.S. Cl. .................................................. 73/118.2
[58] Field of Search .................... 73/118.2, 204, 117.3; 123/494; 364/551

[56] References Cited

U.S. PATENT DOCUMENTS 4,527,422  7/1985  Honig et al. ........................ 73/117.3

FOREIGN PATENT DOCUMENTS

56-135728  10/1981  Japan .

*Primary Examiner*—Jerry W. Myracle
*Attorney, Agent, or Firm*—Gerald J. Ferguson, Jr.; Michael P. Hoffman; Ronni S. Malamud

[57] ABSTRACT

An acceleration detecting system for an internal combustion engine comprises air flow determining elements for determining intake air mass flow in an inlet channel provided to the engine and acceleration judging circuitry for judging an accelerating condition of the engine on the strength of an output of the air flow determining elements. The acceleration judging circuitry includes circuitry for detecting variations in the output of said air flow determining elements at intervals of a first predetermined period to produce a first variation output, circuitry for finding a first condition wherein the first variation output is equal to or larger than a first predetermined value, circuitry for detecting variations in the output of the air flow determining elements at intervals of a second predetermined period shorter than the first predetermined period or continuously to produce a second variation output, circuitry for finding a second condition wherein the second variation output is equal to or larger than a second predetermined value, and circuitry for sending out an acceleration signal when the first condition is found and in addition the second condition is found successively during a period which almost corresponds in duration to the first predetermined period and in which the first condition is found.

10 Claims, 29 Drawing Figures

ACCELERATION DETECTING SYSTEMS FOR INTERNAL COMBUSTION ENGINES

BACKGROUND OF THE INVENTION

1. Field of the Invention

The present invention relates generally to acceleration detecting systems for internal combustion engines, and more particularly, to a system for detecting an accelerating condition of an internal combustion engine on the basis of variations in intake air mass flow in an inlet channel provided to the internal combustion engine.

2. Description of the Prior Art

In an internal combustion engine equipped with an electronic fuel injection system, on the occasion of an accelerating condition thereof, a fundamental quantity of fuel, which is calculated on the strength of engine speed and engine load which varies in propotion to intake air mass flow in an inlet channel provided to the engine or depression at the inlet channel, is revised in a predetermined manner to produce a final quantity of fuel by which the fuel is injected into the inlet channel, so that the fuel supplied to a combustion chamber of the engine is increased in response to an augmentation in intake air mass flow resulting from an increase in opening degree of throttle. With such an increase in fuel in the inlet channel brought about in response to the increase in intake air mass flow, the combustibility in the accelerating condition of the engine is raised to improve the operation performance of the engine, and further fuel consumption, exhaust characteristic and so on are improved.

For revising the fundamental quantity of fuel in the accelerating condition of the engine in such a manner as mentioned above, there has been proposed a system for detecting acceleration in the engine, which comprises an air flow sensor for determining intake air mass flow in the inlet channel which varies in response to variations in opening degree of throttle corresponding to the movement of an accelerating pedal provided to the engine and producing a determination output signal corresponding to the determined intake air mass flow, means for differentiating the determination output signal from the air flow sensor to obtain the variation rate of the intake air mass flow in the inlet channel, means for comparing the value of the variation rate of the intake air mass flow with a predetermined value set for the accelerating operation of the engine, and means for finding the accelerating condition of the engine on the basis of the output of the comparing means when the value of the variation rate of the air mass flow is equal to or more than the predetermined value.

As disclosed in, for example, the Japanese patent application published before examination with the publication No. 56-135728, there has been also proposed an air flow sensor of a hot wire type for use in determination of intake air mass flow in an inlet channel of an engine. The air flow sensor of a hot wire type is composed of a platinum heating wire provided in the inlet channel and a power supply for supplying a current to the platinum heating wire so as to cause the latter to heat. The current flowing through the platinum heating wire is varied in propotion to variations in intake air mass flow in the inlet channel and the variation of the current flowing through the platinum heating wire is derived in the form of voltage variation to be a determination output. This air flow sensor of a hot wire type is superior in sensitivity to the variations in intake air mass flow in the inlet channel compared with, for example, an air flow meter of a flap type.

Figure 1A:
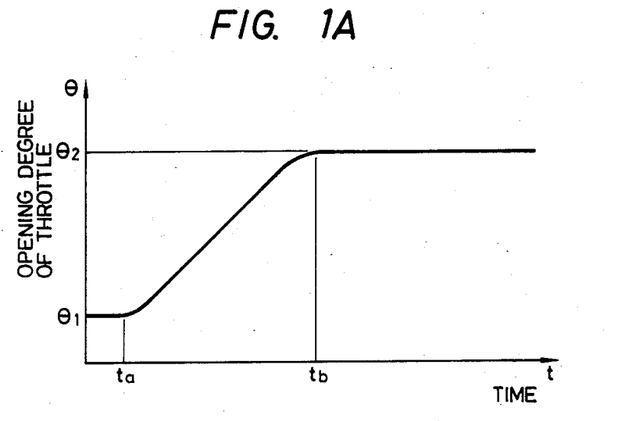
FIG. 1A is a characteristic chart showing variations in opening degree of throttle in an engine.
Figure 1B:
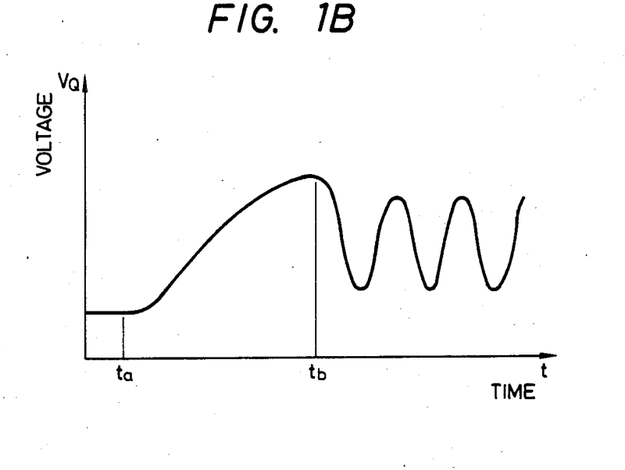
FIG. 1B is a characteristic chart showing variations of the output of an air flow sensor resulting from the variations shown in FIG. 1A.

In the case where the air flow sensor of a hot wire type is used, when the engine is in an accelerating condition wherein opening degree of throttle $\theta$ is changed into a relatively large degree $\theta_2$ from a relatively small degree $\theta_1$ within a period from a time point $t_a$ to a time point $t_b$, and then in a condition wherein the opening degree of throttle $\theta$ is held to be the relatively large degree $\theta_2$ in a period after the time point $t_b$, as shown in a graph of FIG. 1A with the ordinate representing the opening degree of throttle $\theta$ and the abscissa representing time t, a voltage $V_Q$ obtained from the air flow sensor of a hot wire type as a determination output for the intake air mass flow may varies with relatively steep pulsations of a small-scale during the period wherein the opening degree of throttle $\theta$ is held to be the relatively large degree $\theta_2$ after the accelerating period from the time point $t_a$ to the time point $t_b$, as shown in a graph of FIG. 1B with the ordinate representing the voltage $V_Q$ and the abscissa representing time t.

These small-scale pulsations in the voltage $V_Q$ result from the fact that the air flow sensor of a hot wire type is operative to determine sensitively small variations in intake air mass flow in the inlet channel caused due to the loss of the intake air mass flow in the inlet channel or the sucking and exhausting operations of the engine. Then, when the voltage $V_Q$ containing such small-scale pulsations is subjected to differentiation for obtaining the variation rate of the intake air mass flow in the previously proposed accelerating detecting system as mentioned above, relatively large differentiation results which are used for finding the accelerating condition of the engine are produced from the small-scale pulsations in the voltage $V_Q$, and as a result, a wrong detection of the accelerating condition of the engine is likely to be made when the engine is not actually in the accelerating condition.

Such a problem may be also caused similarly in the case where an air flow sensor of a Kármán vortex type is employed in the inlet channel provided to the engine in place of the air flow sensor of a hot wire type.

OBJECTS AND SUMMARY OF THE INVENTION

Accordingly, it is an object of the present invention to provide an acceleration detecting system for an internal combustion engine which avoids the aforementioned problem encountered with the prior art.

Another object of the present invention is to provide an acceleration detecting system for an internal combustion engine in which intake air mass flow in an inlet channel provided to the engine is determined by air flow determining means such as an air flow sensor of a hot wire type or a Kármán vortex type, a determination output signal from the air flow determining means is processed by processing means operative to obtain the variation rate of the determination output signal, and the variation rate obtained by the processing means is used for finding an accelerating condition of the engine on the strength thereof, and which is improved in its operation so as to prevent a wrong detection of the accelerating condition of the engine.

A further object of the present invention is to provide an acceleration detecting system for an internal combustion engine in which intake air mass flow in an inlet channel provided to the engine is determined by air flow determining means such as an air flow sensor of a hot wire type or a Kármán vortex type, a determination output signal from the air flow determining means is processed by processing means operative to obtain the variation rate of the detection output signal, and the variation rate obtained by the processing means is used for finding an accelerating condition of the engine on the strength thereof, and which can detect reliably the accelerating condition of the engine even though the determination output signal from the air flow determining means contains relatively small-scale pulsations resulting from small variations in intake air mass flow in the inlet channel caused due to the loss of the intake air mass flow in the inlet channel or the sucking and exhausting operations of the engine.

In accordance with the present invention, there is provided an acceleration detecting system for an internal combustion engine, which comprises air flow determining means for determining intake air mass flow in an inlet channel provided to the engine and producing an output signal corresponding to the determined intake air mass flow, first variation detecting means for detecting variations in the output signal from the air flow determining means at intervals of a first predetermined period, first comparing means for comparing the variation detected by the first variation detecting means with a first predetermined value to find a first condition wherein the variation detected by the first variation detecting means is equal to or larger than the first predetermined value, second variation detecting means for detecting variations in the output signal of the air flow determining means at intervals of a second predetermined period shorter than the first predetermined period or continuously, second comparing means for comparing the variation detected by the second variation detecting means with a second predetermined value to find a second condition wherein the variation detected by the second variation detecting means is equal to or larger than the second predetermined value, and output means for sending out an acceleration signal when the first condition is found by the first comparing means and in addition the second condition is found by the second comparing means successively during a period which almost corresponds in duration to the first predetermined period and in which the first condition is found by the first comparing means.

With the acceleration detecting system thus constituted in accordance with the present invention, an increase in intake air mass flow caused during the accelerating condition of the engine can be sensitively detected, and a reliable acceleration signal responding accurately to the actual accelerating condition of the engine can be obtained even though the output signal from the air flow determining means, by which the sensitive detection of the increase in intake air mass flow is carried out, contains relatively small-scale pulsations resulting from small variations in intake air mass flow caused due to the loss of the intake air mass flow in the inlet channel or the sucking and exhausting operations of the engine. This results in that the acceleration in the engine is able to be always detected reliably and precisely.

The above, and other objects, features and advantages of the present invention will become apparent from the following detailed description which is to be read in conjunction with the accompanying drawings.

DESCRIPTION OF THE PREFERRED EMBODIMENTS

Figures 2, 3:
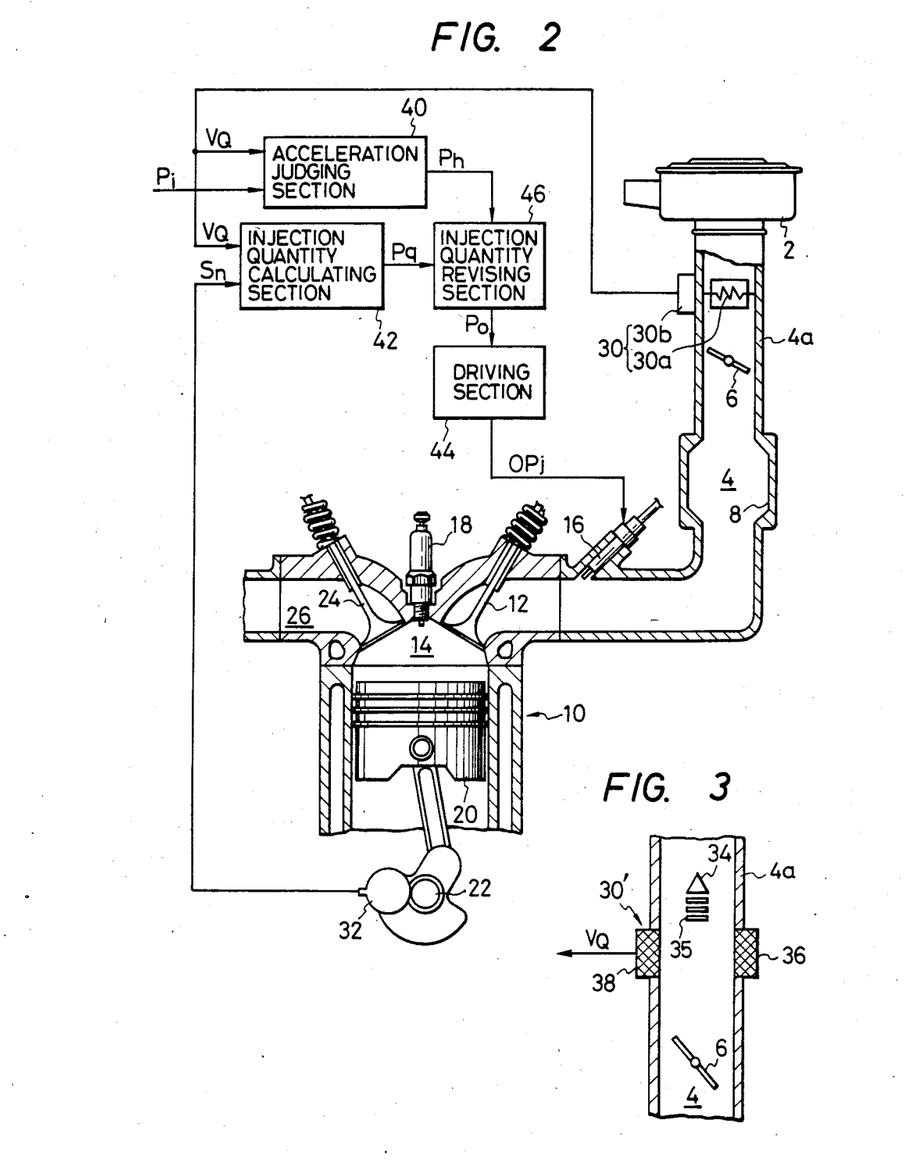
FIG. 2 is a schematic illustration showing one embodiment of acceleration detecting system for an internal combustion engine according to the present invention, together with an essential part of an engine to which the embodiment is applied.
FIG. 3 is a schematic illustration showing an example of an air flow sensor of a Kármán vortex type.

An embodiment of acceleration detecting system for an internal combustion engine according to the present invention is schematically shown in FIG. 2, together with an essential part of an engine to which the embodiment is applied.

Referring to FIG. 2, for determining an intake air mass flow introduced through an air clearner 2 into an inlet channel 4 provided to an engine body 10, an air flow sensor 30 of a hot wire type is mounted on a pipe member 4a forming therein the inlet channel 4. This air flow sensor 30 is composed of a platinum heating wire 30a provided in the inlet channel 4 and a power source 30b disposed at the outside of the inlet channel 4 for supplying a current to the platinum heating wire 30a so as to cause the same to heat. The current flowing through the platinum heating wire 30a which varies in response to the intake air mass flow in the inlet channel 4 is detected in the power source 30b to produce a voltage $V_Q$ corresponding to the detected current. Therefore, this voltage $V_Q$ varies also in response to the intake air mass flow in the inlet channel 4 and is sent out as determination output signal for the intake air mass flow.

The voltage $V_Q$ obtained from the air flow sensor 30 is supplied to an acceleration judging section 40 and an injection quantity calculating section 42 described in detail later. The intake air mass flow in the inlet channel 4 is adjusted by a throttle 6, the opening degree of which is controlled by an accelerating pedal (not shown in the drawings). The intake air having passed through the throttle 6 in the inlet channel 4 is guided through a surge tank 8 to a combustion chamber 14 formed in the engine body 10.

A fuel injector 16, which is controlled to be open and shut by a driving pulse signal OPj supplied from a driving section 44, is provided in the inlet channel 4 so as to inject intermittently fuel pressurized by a fuel feeding device (not shown in the drawings) into the inlet channel 4 in the direction to the downstream portion thereof close to the combustion chamber 14 in order to produce a fuel mixture. The fuel mixture is sucked through an intake valve 12 into the combustion chamber 14 and ignited by a spark plug 18 to burn therein, so that a piston 20 is reciprocated to cause a crankshaft 22 to rotate. Then, an exhaust gas resulting from the combustion of the fuel mixture is discharged through an exhaust valve 24 into an outlet channel 26.

Further, a engine speed sensor 32 is provided in relation to the crankshaft 22 for detecting the engine speed and producing a detection output signal Sn varying in response to the detected engine speed. The detection output signal Sn obtained from the engine speed sensor 32 is supplied to the injection quantity calculating section 42.

In such a configuration, the air flow sensor 30 may be replaced with an air flow sensor 30' of a Kármán vortex type as shown in FIG. 3. The air flow sensor 30' of a Kármán vortex type shown in FIG. 3 is composed of a vortex generator 34 disposed in the inlet channel 4, a plurality of vortex stabilizers 35 disposed to accomany with the vortex generator 34 in the inlet channel 4, a supersonic oscillator 36 attached to the pipe member 4a for emitting a supersonic wave toward the inlet channel 4, and a supersonic detector 38 attached to the pipe member 4a for receiving the supersonic wave emitted from the supersonic oscillator 36 and having passed through the inlet channel 4.

In the case of the air flow sensor 30' of a Kármán vortex type, the number of Kármán vortexes formed in the inlet channel 4 by the vortex generator 34 accompanied with the vortex stabilizers 35 is varied in response to variations in intake air mass flow in the inlet channel 4, and the supersonic wave emitted from the supersonic oscillator 36 is deformed into a compression wave having compressed portions corresponding to the number of Kármán vortexes formed in the inlet channel 4 when it passes through the inlet channel 4. Then, the supersonic detector 38 detects the compression wave from the inlet channel 4 to produce a detection output voltage signal having variations therein in accordance with the compressed portions of the compression wave. Consequently, the detection output voltage signal from the supersonic detector 38 represents the intake air mass flow in the inlet channel 4, and supplied to the acceleration judging section 40 and the injection quantity calculating section 42 as the voltage $V_Q$ aforementioned.

Furthermore, in such the air flow sensor 30' of a Kármán vortex type, it is also possible to use light in place of the supersonic wave. In such a case, the supersonic oscillator 36 is replaced with a light source and the supersonic detector 38 is replaced with a photodetector.

In the injection quantity calculating section 42, a fundamental quantity of fuel is calculated on the strength of both the voltage $V_Q$ supplied from the air flow sensor 30 and the detection output signal Sn supplied from the engine speed sensor 32, and then a fundamental injection control signal Pq representing the fundamental quantity of fuel is formed to be supplied to an injection quantity revising section 46.

While, in the acceleration judging section 40, a variation rate of the intake air mass flow represented by the voltage $V_Q$ is obtained, and it is checked whether the engine is in the accelerating condition or not on the basis of the value of the variation rate of the intake air mass flow obtained therein. Then, if it is clarified that the engine is in the accelerating condition, an acceleration signal Ph is sent out from the acceleration judging section 40 to be supplied to the injection quantity revising section 46. In addition, an ignition pulse Pi derived from an ignition coil (not shown in the drawings) is also supplied to the acceleration judging section 40 so as to be used for the judgement of the accelerating condition of the engine performed on the basis of the value of the variation rate of the intake air mass flow.

In the injection quantity revising section 46 the fundamental quantity of fuel represented by the fundamental injection control signal Pq is revised in a predetermined manner and a final injection control signal Po which represents the revised fundamental quantity of fuel is produced when the acceleration signal Ph is supplied thereto from the acceleration judging section 40, and the final injection control signal Po which represents the fundamental quantity of fuel without any revision is produced when the acceleration signal Ph is not supplied thereto from the acceleration judging section 40. The final injection control signal Po thus obtained is supplied to the driving section 44.

The driving section 44 generates the driving pulse signal OPj having the pulse width corresponding to the quantity of fuel represented by the final injection control signal Po and supplies the same to the fuel injector 16. The fuel injector 16 to which the driving pulse signal OPj is supplied is controlled to be open and shut in accordance with the driving pulse signal OPj so as to carry out the fuel injection with the quantity of fuel represented by the final injection control signal Po.

Figure 4:
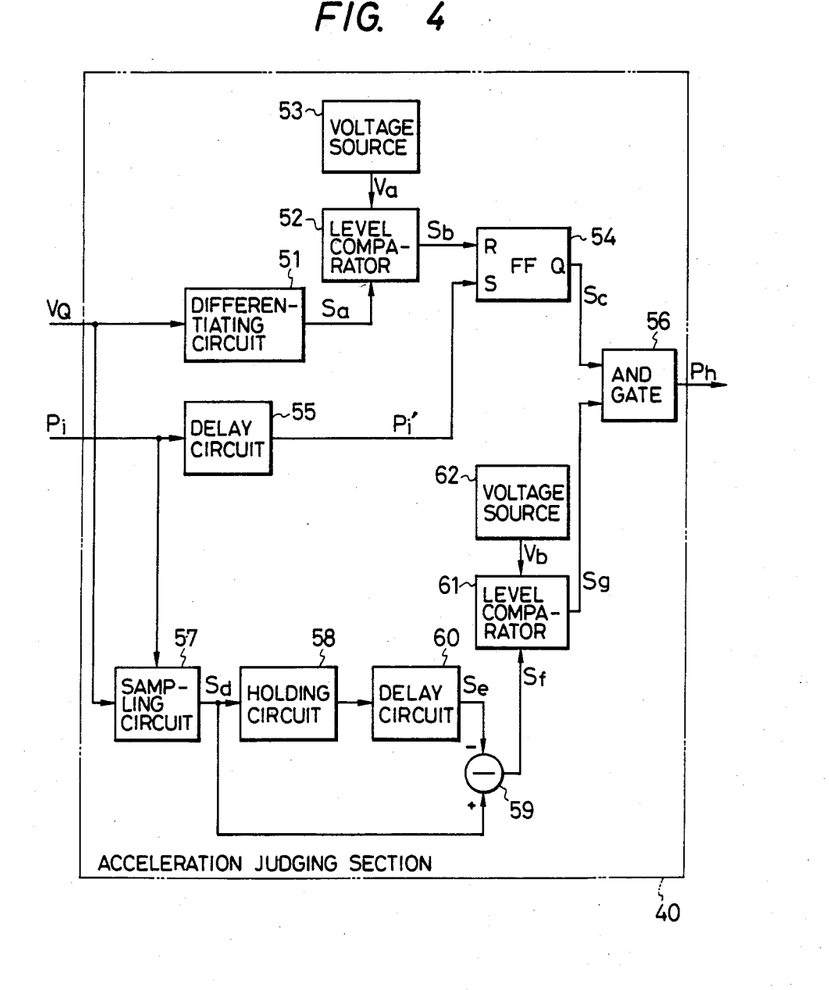
FIG. 4 is a block diagram showing an example of an acceleration judging section used in the embodiment shown in FIG. 2.

In the above mentioned operation control arrangement for the engine body 10, the air flow sensor 30 and the acceleration judging section 40 constitute the embodiment of the acceleration detecting system according to the present invention, and one example of the acceleration judging section 40 is constructed as shown in FIG. 4.

In the example of the acceleration judging section 40 shown in FIG. 4, a differentiating circuit 51 is provided to be supplied with the voltage $V_Q$, which is the determination output signal for the intake air mass flow, from the air flow sensor 30. This differentiating circuit 51 produces an output Sa representing a differentiation result of the voltage $V_Q$, namely, the variation rate of the intake air mass flow and supplies the output Sa to a level comparator 52. That is, the differentiating circuit 51 is operative to detect continuously the variations in the voltage $V_Q$ supplied from the air flow sensor 30 and to supply a detection output to the level comparator 52. The level comparator 52 compares the output Sa of the differentiating circuit 51 with a first reference voltage Va set up by a voltage source 53, and produces an output Sb which has a high level when the level of the output Sa is equal to or higher than the level of the first reference voltage Va, and a low level when the level of the output Sa is lower than the level of the first reference voltage Va. This output Sb is supplied to a reset terminal R of a R-S flip-flop circuit 54. In this case, the level of the first reference voltage Va is set to be zero volt.

The ignition pulse Pi is delayed by a predetermined short time Δt at a delay circuit 55 to produce a delayed ignition pulse Pi' and the delayed ignition pulse Pi' is supplied to a set terminal S of the R-S flip-flop circuit 54. The R-S flip-flop circuit 54 is set when the delayed ignition pulse Pi' is supplied to the set terminal S thereof and reset when the level of the output Sb supplied to the reset terminal R thereof is turned to be low from high, and produces at an output terminal Q thereof an output Sc which has a high level during the set state and a low level during the reset state. The output Sc obtained at the output terminal Q of the R-S flip-flop circuit 54 is supplied to one of input terminals of an AND circuit 56.

Further, both the voltage $V_Q$ obtained from the air flow sensor 30 and the ignition pulse Pi are supplied to a sampling circuit 57. The sampling circuit 57 is operative to sample the voltage $V_Q$ in synchronism with the ignition pulse Pi and to produce intermittently a sampled output Sd having a level corresponding to the level of the voltage $V_Q$ at a point of time at which the ignition pulse Pi is supplied thereto. This sampled output Sd is supplied to a holding circuit 58 and also to a plus input terminal of a subtracting circuit 59.

The holding circuit 58 is operative to hold the level of each sampled output Sd supplied thereto from the sampling circuit 57 and to send out an output resulting from the holding. Accordingly, the level of the output from the holding circuit 58 is renewed every point of time at which the ignition pulse Pi is supplied to the sampling circuit 57. The output from the holding circuit 58 is supplied to a delay circuit 60 to be delayed thereat by the predetermined short time Δt, so that a delayed output Se is obtained from the delay circuit 60. This delayed output Se from the delay circuit 60 is supplied to a minus input terminal of the subtracting circuit 59.

The subtracting circuit 59 is operative to subtract the level of the delayed output Se supplied to its minus input terminal from the level of the sampled output Sd supplied to its plus input terminal so as to produce an output Sf having a positive or negative level corresponding to the difference between the level of the delayed output Se and the level of the sampled output Sd. The output Sf thus obtained from the subtracting circuit 59 is supplied to a level comparator 61. This means that, in the subtracting circuit 59, the level of the output from the holding circuit 58 obtained immediately before a point of time at which each sampled output Sd is obtained, more exactly, at a point of time antedating the point of time of each sampled output Sd by the predetermined short time Δt, is subtracted from the level of that sampled output Sd, that is, each successive two sampled outputs Sd are processed so that the level of the former is subtracted from the level of the latter, and the output Sf having the level corresponding to the difference therebetween is intermittently produced.

The level comparator 61 compares the output Sf of the subtracting circuit 59 with a second reference voltage Vb set up by a voltage source 62, and produces an output Sg which has a high level when the level of the output Sf is equal to or higher than the level of the second reference voltage Vb, and a low level when the level of the output Sf is lower than the level of the second reference voltage Vb. This output Sg is supplied to the other of the input terminals of the AND circuit 56. In this case, the level of the second reference voltage Vb is also set to be zero volt. The AND circuit 56 produces an output, which is the acceleration signal Ph, only when the output Sc of the R-S flip-flop circuit 54 and the output Sg of the level comparator 61 have the respective high levels simultaneously.

Figures 5A, 5B, 5C:
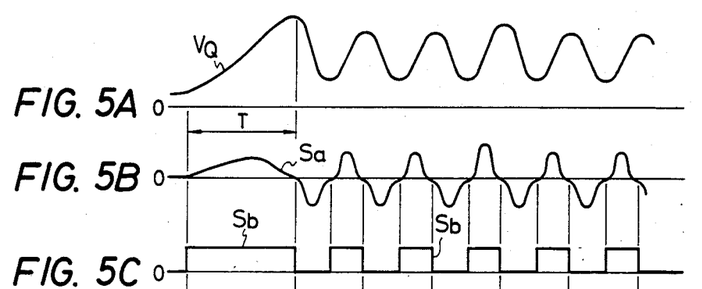
FIGS. 5A to 5K are waveform diagrams used for explaining the operation of the acceleration judging section shown in FIG. 4.

When the voltage $V_Q$ supplied to the acceleration judging section 40 thus constructed from the air flow sensor 30 has, for example, the variations as shown in FIG. 5A, which appear during the accelerating condition and the normal condition successive thereto of the engine, in an acceleration period T, the output Sa of the differentiating circuit 51 has the level which varies first to be positive from zero and then to return to zero, as shown in FIG. 5B, in response to an increase rate of the intake air mass flow represented by the voltage $V_Q$. This output Sa of the differentiating circuit 51 is supplied to the level comparator 52 to be compared with the first reference voltage Va. As a result of the comparison, the output Sb rising to the high level at the beginning end of the acceleration period T and falling to the low level at the terminating end of the acceleration period T, as shown in FIG. 5C, is obtained from the level comparator 52 and supplied to the reset terminal R of the R-S flip-flop circuit 54.

Figure 5D:
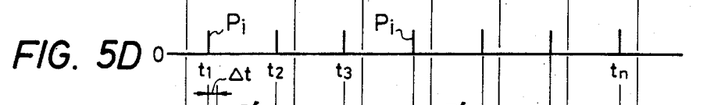
Figure 5E:
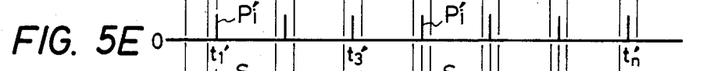
Figure 5F:
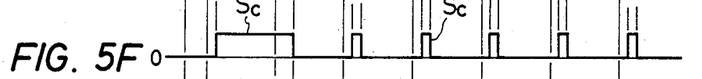

At this time, the delayed ignition pulse Pi' derived from a delay circuit 55 which is operative to delay the ignition pulse Pi appearing at intervals of such a period as shown in FIG. 5D by the predetermined short time Δt, as shown in FIG. 5E, is supplied to the set terminal S of the R-S flip-flop circuit 54, and therefore the R-S flip-flop circuit 54 is set by the delayed ignition pulse Pi' obtained at a time point $t_1'$ delayed by the predetermined short time Δt from a time point $t_1$ at which the ignition pulse Pi appears. Then, the R-S flip-flop circuit 54 is reset by the level change of the output Sb of the level comparator 52 to the low level from the high level arising at the terminating end of the acceleration period T, so that the output Sc having the high level during a period from the time point $t_1'$ to the terminating end of the acceleration period T, as shown in FIG. 5F, is obtained at the output terminal Q of the R-S flip-flop circuit 54 and supplied to the AND circuit 56.

Figures 5G, 5H:
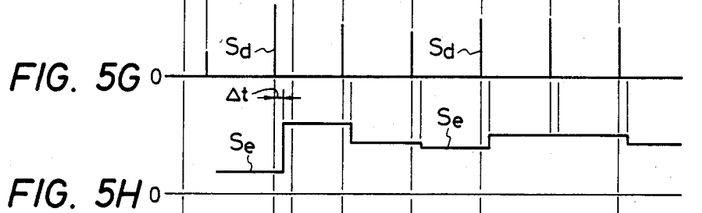

Meanwhile, the sampled output Sd corresponding to the level of the voltage $V_Q$ is obtained from the sampling circuit 57 at each of the time point $t_1$ and a time point $t_2$, at each of which the ignition pulse Pi is supplied thereto, as shown in FIG. 5G. This sampled output Sd is supplied to both to the holding circuit 58 and the plus input terminal of the subtracting circuit 59. Then, in the delay circuit 60, the output from the holding circuit 58 obtained by holding the level of the sampled output Sd derived at each of the time points $t_1$ and $t_2$ from the sampling circuit 57 is delayed by the predetermined short time Δt, and the delayed output Se having a stepped level as shown in FIG. 5H is obtained from the delay circuit 60 to be supplied to the minus input terminal of the subtracting circuit 59.

Figure 5I:
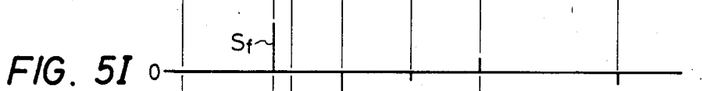
Figure 5J:
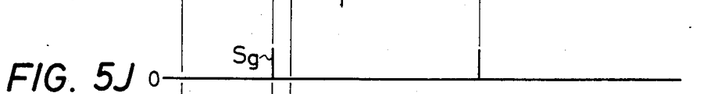

In the subtracting circuit 59, the level of the delayed output Se of the delay circuit 60 obtained at the time point $t_2$, that is, the level of the sampled output Sd obtained at the time point $t_1$ is subtracted from the level of the sampled output Sd obtained at the time point $t_2$, and the output Sf having a level corresponding to the difference between those levels, as shown in FIG. 5I, is derived from the subtracting circuit 59. This output Sf of the subtracting circuit 59 is supplied to the level comparator 61 to be compared with the second reference voltage Vb which has the level of zero volt. As a result of the comparison, the output Sg having the high level, as shown in FIG. 5J, is obtained from the level comparator 61 to be supplied to the AND circuit 56.

Figure 5K:
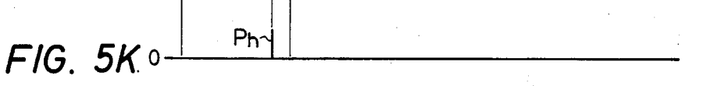

Consequently, at the time point $t_2$ in the period during which the output Sc of the R-S flip-flop circuit 54 which has the high level is supplied to one of the input terminals of the AND circuit 56, the output signal Sg of the level comparator 61 which has the high level is supplied to the other of the input terminals of the AND circuit 56, and therefore the AND circuit 56 sends out the acceleration signal Ph obtaind in the form of a pulse as shown in FIG. 5K. In such a manner as described above, the accelerating condition of the engine is reliably detected in the acceleration period T.

In a period successive to the acceleration period T, since the voltage $V_Q$ obtained from the air flow sensor 30 has relatively steep pulsations of a small-scale, as shown in FIG. 5A, the output Sa of the differentiating circuit 51, which represents a variation rate of such small-scale pulsations, has positive and negative levels varying with relatively large amplitude, as shown in FIG. 5B. Accordingly, the output Sb having the high level intermittently in response to periods in each of which the output Sa of the differentiating circuit 51 has the positive level, as shown in FIG. 5C, is obtained from the level comparator 52 and supplied to the reset terminal R of the R-S flip-flop circuit 54.

At this time, the delayed ignition pulse Pi' derived from the delay circuit 55 which is operative to delay the ignition pulse Pi appearing at each of time points $t_3$, --- $t_n$ such as shown in FIG. 5D by the predetermined short time $\Delta t$, at each of time points $t_3'$, --- $t_n'$ shown in FIG. 5E, is supplied to the set terminal S of the R-S flip-flop circuit 54. Since the output Sb of the level comparator 52 having the high level intermittently has its falling and rising edges at time points coming after the time points $t_3'$, --- $t_n'$, respectively, the R-S flip-flop circuit 54 is set by the delayed ignition pulse Pi' obtained at each of the time points $t_3'$, --- $t_n'$ and reset by the falling edge of the output Sb of the level comparator 52 at each of the time points coming after the time points $t_3'$, --- $t_n'$, so that the output Sc having the high level during a period from each of the time point $t_3'$, --- $t_n'$ to the time point at which the output Sb of the level comparator 52 has the falling edge thereafter, as shown in FIG. 5F, is obtained at the output terminal Q of the R-S flip-flop circuit 54 and supplied to the AND circuit 56.

Meanwhile, the sampled output Sd corresponding to the level of the voltage $V_Q$ is obtained from the sampling circuit 57 at each of the time points $t_1$, --- $t_n$ at each of which the ignition pulse Pi is supplied thereto, as shown in FIG. 5G. This sampled output Sd is supplied to both to the holding circuit 58 and the plus input terminal of the subtracting circuit 59. Then, in the delay circuit 60, the output from the holding circuit 58 obtained by holding the level of the sampled output Sd derived at each of the time points $t_3$, --- $t_n$ from the sampling circuit 57 is delayed by the predetermined short time $\Delta t$, and the delayed output Se having a stepped level as shown in FIG. 5H is obtained from the delay circuit 60 to be supplied to the minus input terminal of the subtracting circuit 59.

In the subtracting circuit 59, the level of the delayed output Se of the delay circuit 60 obtained at each of the time points $t_3$, --- $t_n$, that is, the level of the sampled output Sd obtained at each of the time points $t_2$, --- $t_{n-1}$ is subtracted from the level of the sampled output Sd obtained at each of the time points $t_3$, --- $t_n$, and the output Sf having a level corresponding to the difference between those levels, as shown in FIG. 5I, is derived from the subtracting circuit 59. This output Sf of the subtracting circuit 59 is supplied to the level comparator 61 to be compared with the second reference voltage Vb which has the level of zero volt. As a result of the comparison, the output Sg having the high level when the output Sf of the subtracting circuit 59 has the positive level, as shown in FIG. 5J, is obtained from the level comparator 61 to be supplied to the AND circuit 56.

In such a case, the output Sg of the level comparator 61 has the high level at any of the time points $t_3$, --- $t_n$, each of which is not included in the period in which the output Sc of the R-S flip-flop 54 has the high level. Consequently, there is no such occasion that the output Sc of the R-S flip-flop circuit 54 having the high level and the output Sg of the level comparator 61 having the high level are supplied to the AND circuit 56 simultaneously, and therefore the AND circuit 56 does not produce the acceleration signal Ph. As a result of this, a wrong judgement of the accelerating condition of the engine is avoided.

As apparent from the above, in this example, the acceleration signal Ph is obtained only when the intake air mass flow increases continuously during a period equal in duration to or longer in duration than the period of the ignition pulses Pi.

Figure 6:
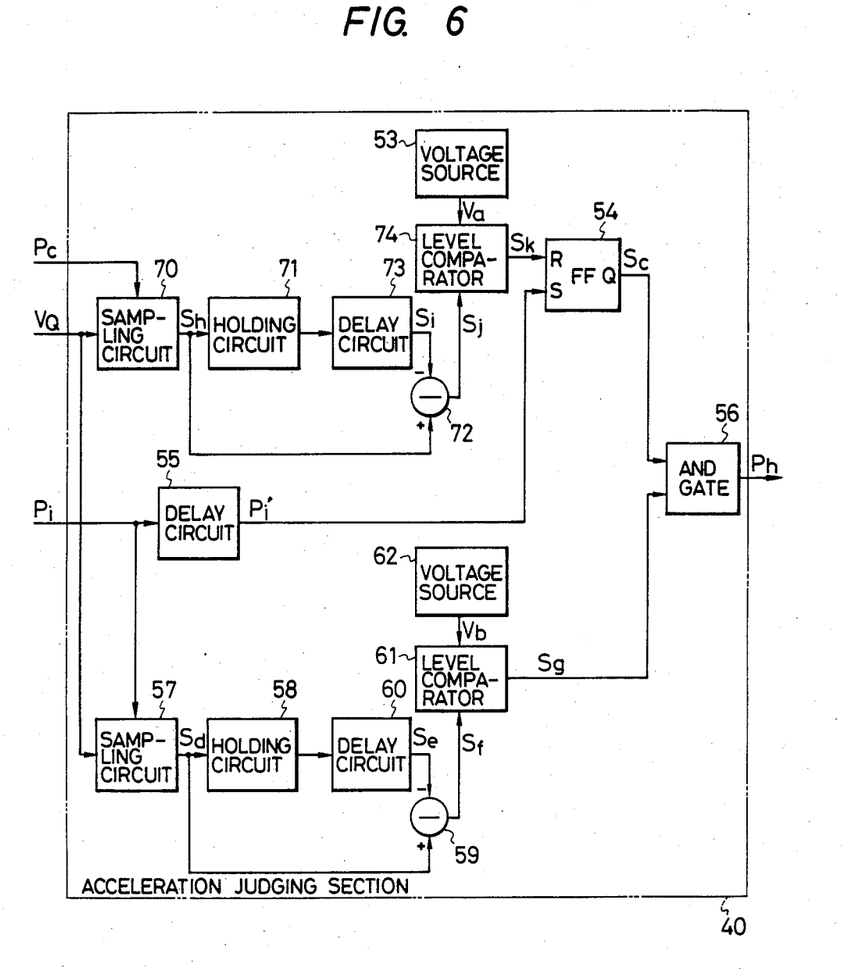
FIG. 6 is a block diagram showing another example of an acceleration judging section used in the acceleration detecting system for an internal combustion engine according to the present invention.

FIG. 6 shows another example of the acceleration judging section 40. In FIG. 6, blocks and signals corresponding to those of FIG. 4 are marked with the same references and further detailed description thereof will be omitted.

In the example shown in FIG. 6, the voltage $V_Q$ which is the determination output signal for the intake air mass flow obtained from the air flow sensor 30 and clock pulses Pc which are supplied from a pulse generator (not shown in the drawings) at intervals of a period shorter than the period of the ignition pulses Pi so that a plurality of clock pulses Pc are obtained during each period of the ignition pulses Pi, are supplied to a sampling circuit 70 as an input signal and a sampling control signal, respectively. In the case where the voltage $V_Q$ has the level containing periodic pulsations of a small-scale, the period of the clock pulses Pc may be selected to be shorter than a half of a period of the periodic pulsations contained in the level of the voltage $V_Q$. The sampling circuit 70 is operative to sample the voltage $V_Q$ in synchronism with the clock pulse Pc and to produce intermittently a sampled output Sh having a level corresponding to the level of the voltage $V_Q$ obtained at a point of time at which the clock pulse pc is supplied thereto. This sampled output Sh is supplied to a holding circuit 71 and also a plus input terminal of a subtracting circuit 72.

The holding circuit 71 is operative to hold the level of each sampled output Sh supplied thereto from the sampling circuit 70 and to send out an output resulting from the holding. Accordingly, the level of the output from the holding circuit 71 is renewed every point of time at which the clock pulse Pc is supplied to the sampling circuit 70. The output from the holding circuit 71 is supplied to a delay circuit 73 to be delayed thereat by the predetermined short time $\Delta t$, so that a delayed output Si is obtained from the delay circuit 73. This delayed output Si from the delay circuit 73 is supplied to a minus input terminal of the subtracting circuit 72.

The subtracting circuit 72 is operative to subtract the level of the delayed output Si supplied to its minus input terminal from the level of the sampled output Sh supplied to its plus input terminal so as to produce an output Sj having a positive or negative level corresponding to the difference between the level of the delayed output Si and the level of the sampled output Sh. The output Sj thus obtained from the subtracting circuit 72 is supplied to a level comparator 74.

The level comparator 74 compares the output Sj of the subtracting circuit 72 with the first reference voltage Va set up by the voltage source 53, and produces an output Sk which has a high level when the level of the output Sj is lower than the level of the first reference voltage Va, and a low level when the level of the output Sj is equal to or higher than the level of the first reference voltage Va. This output Sk is supplied to the reset terminal R of the R-S flip-flop circuit 54. The level of the first reference voltage Va is set, for example, to be zero volt.

To the set terminal S of the R-S flip-flop circuit 54, the delayed ignition pulse Pi' is supplied. The R-S flip-flop circuit 54 is set when the delayed ignition pulse Pi' is supplied to the set terminal S thereof and reset when the output Sk having the high level is supplied to the reset terminal R, and produces at the output terminal Q thereof the output Sc which has the high level during the set state and the low level during the reset state. The output Sc obtained at the output terminal Q of the R-S flip-flop circuit 54 is supplied to one of input terminals of the AND circuit 56.

Other portions are constituted in the same manner as the example shown in FIG. 4.

Figure 7A:
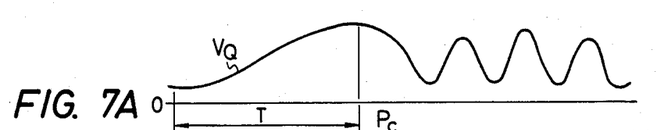
FIGS. 7A to 7K are waveform diagrams used for explaining the operation of the acceleration judging section shown in FIG. 6.
Figures 7B, 7C:
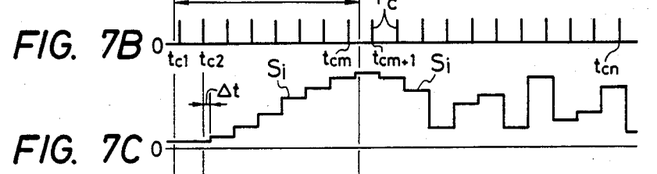

Similarly to the case of the example shown in FIG. 4, when the voltage $V_Q$ supplied to this example from the air flow sensor 30 has, for example, the variations as shown in FIG. 7A, which appear during the accelerating condition and the normal condition successive thereto of the engine, in the acceleration period T, the sampled output Sh corresponding to the level of the voltage $V_Q$ is obtained from the sampling circuit 70 at each of time point $t_{c1}$, $t_{c2}$, $—t_{cm}$ at which the clock pulses Pc having the period shorter than that of the ignition pulses Pi, as shown in FIG. 7B, are supplied thereto, respectively. This sampled output Sh is supplied to both to the holding circuit 71 and the plus input terminal of the subtracting circuit 72. Then in the delay circuit 73, the output from the holding circuit 71 obtained by holding the level of the sampled output Sh derived at each of the time points $t_{c1}$, $t_{c2}$, $—t_{cm}$ from the sampling circuit 70 is delayed by the predetermined short time $\Delta t$, and the delayed output Si having a stepped level as shown in FIG. 7C is obtained from the delay circuit 73 to be supplied to the minus input terminal of the subtracting circuit 72.

Figures 7D, 7E, 7F, 7G:
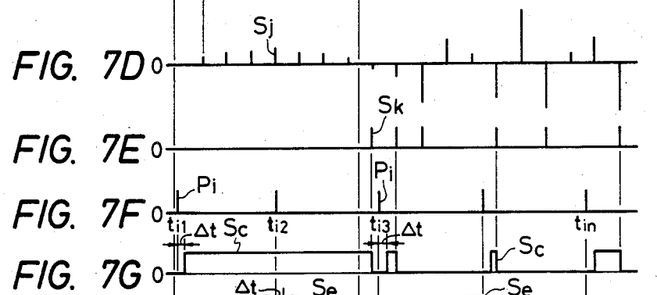

In the subtracting circuit 72, the level of the delayed output Si of the delay circuit 73 obtained at each of the time points $t_{c1}$, $t_{c2}$, $—t_{cm}$ is subtracted from the level of the sampled output Sh obtained at each of the time points $t_{c1}$, $t_{c2}$, $—t_{cm}$, and the output Sj having a level corresponding to the difference between those levels, as shown in FIG. 7D, is derived from the subtracting circuit 72 to be supplied to the level comparator 74. In the acceleration period T, the output Sj of the subtracting circuit 72 continues to have the positive level which is higher than the level of the first reference voltage Va and therefore the output Sk having the high level is not obtained from the level comparator 74, as shown in FIG. 7E.

At this time, since the delayed ignition pulse Pi' derived from the delay circuit 55 which is operative to delay each of the ignition pulses Pi having the period longer than that of the clock pulses Pc, as shown in 7F, by the predetermined short time $\Delta t$, is supplied to the set terminal S of the R-S flip-flop circuit 54, the R-S flip-flop circuit 54 is set by the delayed ignition pulse Pi' obtained at a time point $t_{c1}+\Delta t$ delayed by the predetermined short time $\Delta t$ from the time point $t_{c1}$ at which the ignition pulse Pi is supplied. The R-S flip-flop circuit 54 thus set maintains the set state at the terminating end of the acceleration period T, because the output Sk of the level comparator 74 having the high level is not supplied to the reset terminal R thereof during the acceleration period T. Accordingly, the output Sc having the high level during a period from the time point $t_{c1}+\Delta t$ to the terminating end of the acceleration period T, as shown in FIG. 7G, is obtained at the output terminal Q of the R-S flip-flop circuit 54 and supplied to the AND circuit 56.

Meanwhile, the sampled output Sd corresponding to the level of the voltage $V_Q$ is obtained from the sampling circuit 57 at each of time points $t_{i1}$ and $t_{i2}$ at each of which the ignition pulse Pi is supplied thereto. This sampled output Sd is supplied to both to the holding circuit 58 and the plus input terminal of the subtracting circuit 59. Then, in the delay circuit 60, the output from the holding circuit 58 obtained by holding the level of the sampled output Sd is delayed by the predetermined short time $\Delta t$, and the delayed output Se having a stepped level as shown in FIG. 7H is obtained from the delay circuit 60 to be supplied to the minus input terminal of the subtracting circuit 59.

Figures 7H, 7I, 7J, 7K:
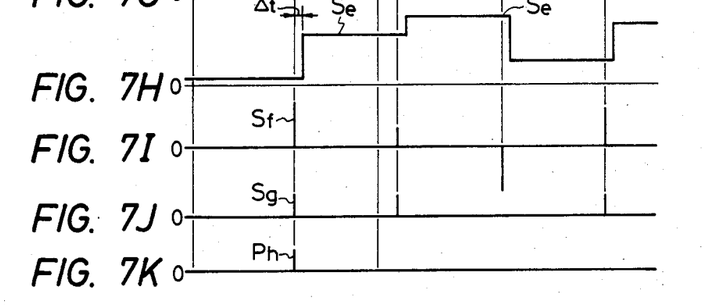

In the subtracting circuit 59, the level of the delayed output Se of the delay circuit 60 obtained at the time point $t_{i2}$ is subtracted from the level of the sampled output Sd obtained at the time point $t_{i2}$, and the output Sf having a level corresponding to the difference between those levels, as shown in FIG. 7I, is derived from the subtracting circuit 59. This output Sf of the subtracting circuit 59 is supplied to the level comparator 61 to be compared with the second reference voltage Vb which has the level of zero volt. As a result of the comparison, the output Sg having the high level, as shown in FIG. 7J, is obtained from the level comparator 61 to be supplied to the AND circuit 56.

Consequently, at the time point $t_{i2}$ in the period during which the output Sc of the R-S flip-flop circuit 54 having the high level is supplied to one of the input terminals of the AND circuit 56, the output Sg of the level comparator 61 having the high level is supplied to the other of the input terminals of the AND circuit 56, and therefore the AND circuit 56 sends out the acceleration signal Ph obtained in the form of a pulse as shown in FIG. 7K. In such a manner as described above, the accelerating condition of the engine is reliably detected in the acceleration period T.

In a period successive to the acceleration period T, since the voltage $V_Q$ obtained from the air flow sensor 30 has relatively steep periodic pulsations of a small-scale, a period of which is more than twice as long as the period of the clock pulses Pc, as shown in FIG. 7A, the delayed output Si from the delay circuit 73, which is formed on the basis of the sampled output Sh obtained by sampling the voltage $V_Q$ at each of time points $t_{cm+1}$, $—t_{cn}$ at each of which the clock pulse Pc is supplied to the sampling circuit 70, has sudden variations in level, as shown in FIG. 7C. Accordingly, the output Sj having a positive or negative level corresponding to the difference between the level of the voltage $V_Q$ sampled at each of the time points $t_{cm+1}$, $-t_{cn}$ and the level of the delayed output Si derived from the delay circuit 73, as shown in FIG. 7D, is obtained from the subtracting circuit 72. This output Sj of the subtracting circuit 72 is supplied to the level comparator 74 to be compared with the first reference voltage Va which has the level of zero volt. As a result of the comparison, the output Sk having the high level when the output Sj of the subtracting circuit 59 has the negative level, as shown in FIG. 7E, is obtained from the level comparator 74 and supplied to the reset terminal R of the R-S flip-flop circuit 54.

At this time, the delayed ignition pulse Pi′ derived from the delay circuit 55 which is operative to delay the ignition pulse Pi supplied thereto at each of time points $t_{i3}$, $-t_{in}$, as shown in 7F, by the predetermined short time $\Delta t$, is supplied to the set terminal S of the R-S flip-flop circuit 54. Accordingly, the R-S flip-flop circuit 54 is first reset by the output Sk of the level comparator 74 at the time point $t_{cm+1}$, then set by the delayed ignition pulse Pi′ at each of time points $t_{i3}+\Delta t$, $-t_{in}+\Delta t$ and reset at each time point at which the output Sk of the level comparator 74 having the high level is obtained, so that the output Sc having such a level shown in FIG. 7G is obtained from the R-S flip-flop circuit 54 to be supplied to the AND circuit 56.

Meanwhile, the sampled output Sd corresponding to the level of the voltage $V_Q$ is obtained from the sampling circuit 57 at each of time points $t_{i3}$, $-t_{in}$, at each of which the ignition pulse Pi is supplied thereto as shown in FIG. 7F. This sampled output Sd is supplied to both the holding circuit 58 and the plus input terminal of the subtracting circuit 59. Then, in the delay circuit 60, the output from the holding circuit 58 obtained by holding the level of the sampled output Sd is delayed by the predetermined short time $\Delta t$, and the delayed output Se having a stepped level as shown in FIG. 7H is obtained from the delay circuit 60 to be supplied to the minus input terminal of the subtracting circuit 59.

In the subtracting circuit 59, the level of the delayed output Se of the delay circuit 60 obtained at each of the time point $t_{i3}$, $-t_{in}$ is subtracted from the level of the sampled output Sd obtained at the time point $t_{i3}$, $-t_{in}$, and the output Sf having a positive or negative level corresponding to the difference between those levels, as shown in FIG. 7I, is derived from the subtracting circuit 59. This output Sf of the subtracting circuit 59 is supplied to the level comparator 61 to be compared with the second reference voltage Vb which has the level of zero volt. As a result of the comparison, the output Sg having the high level when the output Sf of the subtracting circuit 59 has the positive level is obtained from the level comparator 61, as shown in FIG. 7J, and supplied to the AND circuit 56.

In such a case, the output Sg of the level comparator 61 has the high level at any of the time points $t_{i3}$, $-t_{in}$, each of which is not included in the period in which the output Sc of the R-S flip-flop 54 has the high level. Consequently, there is no such occasion that the output Sc of the R-S flip-flop circuit 54 having the high level and the output Sg of the level comparator 61 having the high level are supplied to the AND circuit 56 simultaneously, and therefore the AND circuit 56 does not produce the acceleration signal Ph. As a result of this, a wrong judgement of the accelerating condition of the engine is avoided.

In this example also, the acceleration signal Ph is obtained only when the intake air mass flow increases continuously during a period equal in duration to or longer in duration than the period of the ignition pulses Pi.

Further, the acceleration judging section 40 provided in the embodiment shown in FIG. 2 may be composed of a microcomputer. One example of the operation program of such a microcomputer for judging the accelerating condition of the engine is carried out in accordance with a flow chart shown in FIG. 8.

Figure 8:
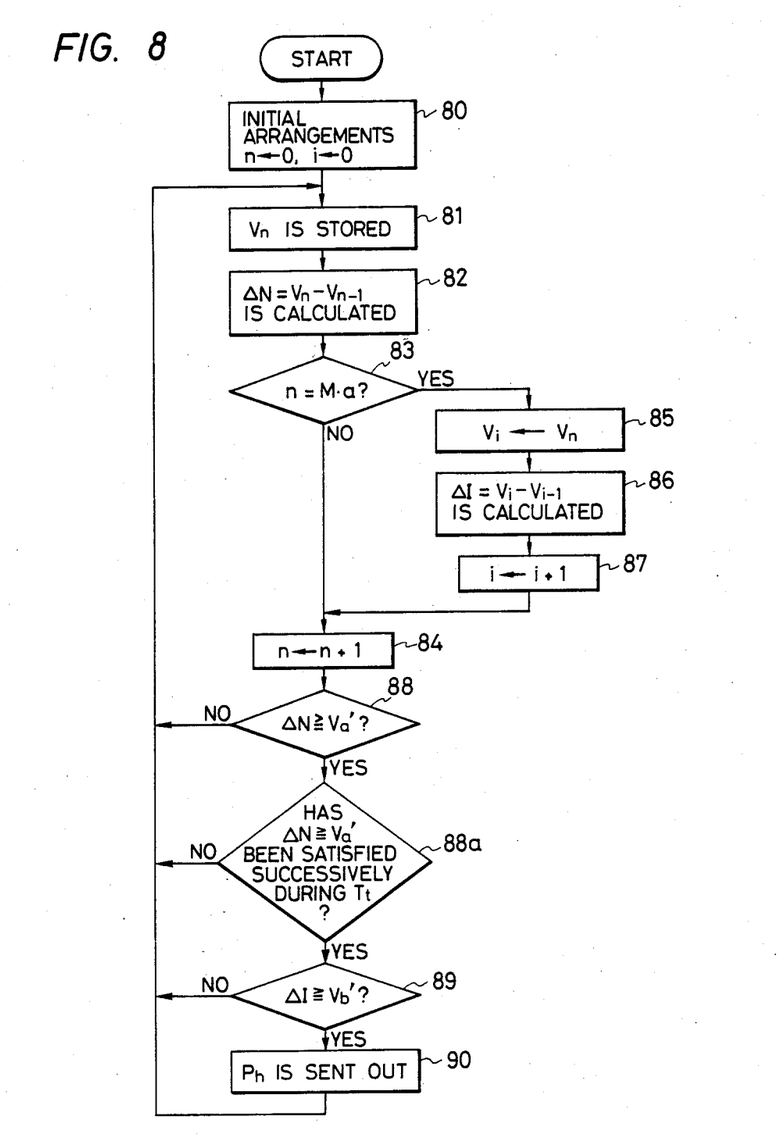
FIG. 8 is a flow chart used for explanation of a further example of an acceleration judging section used in the acceleration detecting system for an internal combustion engine according to the present invention.

According to the flow chart shown in FIG. 8, in the initial arrangements performed in a process 80, numbering flags n and i are set to be 0. Next, in a process 81, the level of the voltage $V_Q$ which is obtained from the air flow sensor 30 as the determination output signal of the intake air mass flow in the inlet channel 4 is sampled at one of time points coming at intervals of a first predetermined period $T_N$ to produce a sampled level Vn, and the sampled level Vn is stored. In the case where the voltage $V_Q$ has the level containing periodic pulsations of a small-scale, the first predetermined period $T_N$ may be selected to be shorter than a half of a period of the periodic pulsations contained in the level of the voltage $V_Q$. Further, in a process 82, a difference $\Delta N$ between the sampled level Vn and a sampled level $V_{n-1}$ which has been stored in the process 81 within the preceding execution of the program is calculated.

Then, in a dicision 83, it is checked whether the numbering flag n represents M·a or not, where M is an indefinite positive integer and a is a constant. When the numbering flag n does not represent M·a, the step is advanced to a process 84. To the contrary, when the numbering flag n represents M·a, the step is advanced to a process 85. In the process 85, a supplemental sampled level Vi corresponding to a sampled level obtained by sampling that level of the voltage $V_Q$ at one of time points coming at intervals of a second predetermined period $T_I$ which is longer in duration than the first predetermined period $T_N$ so as to safisfy the relation: $T_I = M \cdot a \cdot T_N$, is created to be equal to the sampled level Vn and stored. After that, in a process 86, a difference $\Delta I$ between the supplemental sampled level Vi and a supplemental sampled level $V_{1-I}$ which has been stored in the process 85 within the preceding execution of the program is calculated. Then, in a process 87, the numbering flag i is increased by 1, and the step is advanced to the process 84.

In the process 84, the numbering flag n is increased by 1, and in a decision 88, it is checked whether the difference $\Delta N$ calculated in the process 82 is equal to or larger than a first reference voltage level Va′ which is set to be zero volt, for example, or not. If it is clarified that the difference $\Delta N$ is smaller than the first reference voltage level Va′, the step returns to the process 81 to repeat the above mentioned operations from the process 81. On the other hand, when the difference $\Delta N$ is equal to or larger than the first reference voltage level Va′, it is checked whether the difference $\Delta N$ has been equal to or larger than the first reference voltage level Va′ successively during the second predetermined period $T_I$ or not, in a decision 88a. If not, the step returns to the process 81 to repeat the above mentioned operations from the process 81, while if it is clarified that the difference $\Delta N$ has been equal to or larger than the first reference voltage level Va′ successively during the second predetermined period $T_I$, it is checked whether the difference $\Delta I$ calculated in the process 86 is equal to or larger than a second reference voltage level Vb' which is also set to be zero volt, for example, or not, in a decision 89.

When the difference ΔI is smaller than the second reference voltage level Vb', the step returns to the process 81 to repeat the above mentioned operations from the process 81. To the contrary, it is clarified that the difference ΔI is equal to or larger than the second reference voltage level Vb', the acceleration signal Ph is sent out, in a process 90, and then the step returns to the process 81 to repeat the above mentioned operations from the process 81.

With such operations of the microcomputer constituting the acceleran judging section 40 as described above, the acceleration signal Ph is obtained only when the intake air mass flow increases continuously during the second predetermined period $T_J$, and in this case, the second predetermined period $T_J$ may be selected to be equal in duration to or longer in duration than the period of the ignition pulses Pi.

As apparent from the detailed description set forth above, with the embodiment of the present invention having the acceleration judging section 40 which is embodied with each of the examples explained with reference to FIGS. 4 to 8, a reliable and precise detection of the accelerating condition of the engine is performed under a situation in which the voltage $V_Q$ obtained from the air flow senser 30 has the level variations containing the small-scale pulsations after the acceleration period T, as shown in FIG. 5A or 7A. Consequently, the operation control arrangement for the engine shown in FIG. 2 works appropriately with the acceleration signal Ph supplied properly from the embodiment of the present invention so as to prevent the injection quantity revising section 46 from providing undesirable revisions to quantity of fuel.

What is claimed is:

1. An acceleration detecting system for an internal combustion engine comprising;

air flow determining means for determining intake air mass flow in an inlet channel provided to the engine and producing an output signal corresponding to the determined intake air mass flow, first variation detecting means for detecting variations in the output signal of said air flow determining means at intervals of a first predetermined period, first comparing means for comparing the variation detected by said first variation detecting means with a first predetermined value to find a first condition wherein the variation detected by said first variation detecting means is equal to or larger than the first predetermined value, second variation detecting means for detecting variations in the output signal of said air flow determining means at intervals of a second predetermined period shorter than said first predetermined period or continuously, second comparing means for comparing the variation detected by said second variation detecting means with a second predetermined value to find a second condition wherein the variation detected by said second variation detecting means is equal to or larger than the second predetermined value, and output means for sending out an acceleration signal when said first condition is found by said first comparing means and in addition said second condition is found by said second comparing means successively during a period which almost corresponds in duration to said first predetermined period and in which said first condition is found by said first comparing means.

2. An acceleration detecting system according to claim 1, wherein said second veriation detecting means is constituted so as to detect the variations in the output signal of said air flow determining means at intervals of said second predetermined period.

3. An acceleration detecting system according to claim 2, wherein said second predetermined period is selected to be shorter than a half of a period of periodic pulsations contained in the output signal of said air flow determining means.

4. An acceleration detecting system according to claim 3, wherein said first predetermined period is selected to be longer than a half of the period of the periodic pulsations contained in the output signal of said air flow determining means.

5. An acceleration detecting system according to claim 4, wherein said air flow determining means comprises an air flow sensor of a hot wire type provided in relation to the inlet channel.

6. An acceleration detecting system according to claim 1, wherein said second variation detecting means is constituted so as to detect continuously the variations in the output signal of said air flow determining means.

7. An acceleration detecting system according to claim 1, wherein said second variation detecting means comprises circuit means for differentiating the output signal of said air flow determining means.

8. An acceleration detecting system according to claim 1, wherein said air flow determining means is constituted so as to determine directly the intake air mass flow in the inlet channel.

9. An acceleration detecting system according to claim 8, wherein said air flow determining means comprises an air flow sensor of a Kármán vortex type provided in relation to the inlet channel.

10. An acceleration detecting system according to claim 8, wherein said air flow determining means comprises an air flow sensor of a hot wire type provided in relation to the inlet channel.

* * * * *